United States Patent Office 3,813,401
Patented May 28, 1974

---

3,813,401
CERTAIN 5-NITROTHIAZOL-2-YL OXAZOLE AND IMIDAZOLE DERIVATIVES
Peter Graham Hughes, Sunningdale, and John Pomfret Verge, Middle Assendon, England, assignors to Lilly Industries Limited, London, England
No Drawing. Filed Mar. 13, 1972, Ser. No. 234,337
Claims priority, application Great Britain, Mar. 30, 1971, 8,253/71
Int. Cl. C07d 99/04, 99/06
U.S. Cl. 260—302 H     5 Claims

ABSTRACT OF THE DISCLOSURE 2-($5^1$-nitro-$2^1$-thiazolylthio) oxazole and imidazole compounds are useful as fungicides, being active against plant pathogenic fungi, especially grey mould and downey mildew infections of fruits, and again various fungi pathogenic to animals such as Candida and dermatophytes. The compounds are prepared by condensation of a salt of the appropriate 2-mercapto-oxazole or imidazole with a 2-halo-5-nitrothiazole.

---

This invention relates to oxazole and imidazole derivatives which are useful as fungicides. The invention also provides fungicidal compositions comprising said derivatives and a process by which these derivatives and said compositions may be prepared.

According to the present invention, there are provided compounds of the formula:

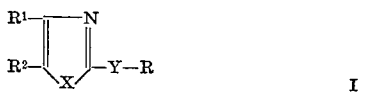

I where R is a 5-nitrothiazol-2-yl group; Y is sulphur or a sulphonyl group; X is oxygen or $NR^3$; $R^3$ is hydrogen, $C_{1-4}$ alkyl, $C_{1-4}$ hydroxyalkyl, $C_{2-4}$ alkenyl, phenyl or phenyl-$C_{1-4}$ alkyl; and $R^1$ and $R^2$ are individually selected from hydrogen, $C_{1-4}$ alkyl and phenyl, or $R^1$ and $R^2$ together form a —CH=CH—CH=$R^4$— chain where $R^4$ is =CH— or =N—.

The term "$C_{1-4}$ alkyl" as used herein means straight and branched hydrocarbon chains having from one to four carbons such as methyl, ethyl, isopropyl, n-butyl, isobutyl and t-butyl.

The terms "$C_{1-4}$ hydroxyalkyl" and "phenyl $C_{1-4}$ alkyl" mean the aforementioned $C_{1-4}$ alkyl groups substituted respectively by a hydroxyl or phenyl group. Examples of such substituted alkyl groups are hydroxymethyl, 2-hydroxyethyl, 3-hydroxypropyl, 1-methyl-2-hydroxyethyl, 3-hydroxybutyl, 1-methyl-3-hydroxypropyl, benzyl, phenethyl, phenopropyl, 2-methyl-2-phenylethyl and phenobutyl.

The term "$C_{2-4}$ alkenyl" means a straight or branched hydrocarbon chain containing two to four carbons and being unsaturated by a double bond, exemplary of which are vinyl, prop-1-enyl, allyl, but-1-enyl, 1-methylallyl, and but-3-enyl.

A preferred group of compounds of formula I are those where X is oxygen or $NR^3$, $R^3$ being hydrogen, methyl, ethyl, vinyl, allyl, phenyl or benzyl, and Y, R, $R^1$ and $R^2$ are as defined above. Most advantageously X is oxygen, and $R^1$ and $R^2$ individually represent hydrogen, methyl, ethyl, or phenyl, or $R^1$ and $R^2$ together represent a —CH=CH—CH=CH— chain.

The compounds of formula I may readily be prepared by condensing a 2-halo-5-nitrothiazole, preferably 2-bromo-5-nitrothiazole, with a salt of a mercapto compound of formula:

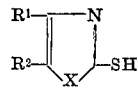

I wherein $R^1$, $R^2$ and X are as defined above, the salt if desired being produced in situ by carrying out the condensation in the presence of a base. Suitable salts of the mercapto compound are alkali metal, alkaline earth metal and tertiary amine salts, especially the sodium and pyridinium salts, whilst suitable bases include alkali metal hydroxides, carbonates, bicarbonates and alkoxides, alkaline earth metal hydroxides and tertiary amines, especially sodium hydroxide, sodium methoxide, sodium ethoxide and pyridine. The reaction is preferably carried out in a suitable solvent or mixture of solvents such as acetone, methanol, ethanol and pyridine and proceeds at room temperature although, in order to shorten the reaction time, elevated temperatures of from 45° C. up to the reflux temperature of the reaction mixture are preferred.

The sulphones of formula I are prepared by conventional oxidation of the corresponding sulphides, for example, using a peracid or salt thereof such as peracetic acid, sodium periodate or m-chlorobenzoic acid.

As examples of compounds of formula I which may be produced by the foregoing process, there may be given:

2-($5^1$-nitro-$2^1$-thiazolylthio)-5-phenyloxazole
2-($5^1$-nitro-$2^1$-thiazolylsulphonyl)-5-phenyloxazole
2-($5^1$-nitro-$2^1$-thiazolylsulphonyl)-4-methyloxazole
2-($5^1$-nitro-$2^1$-thiazolylsulphonyl)-4-isopropyloxazole
2-($5^1$-nitro-$2^1$-thiazolylthio)-4-ethyloxazole
2-($5^1$-nitro-$2^1$-thiazolylthio)-4-methyloxazole
2-($5^1$-nitro-$2^1$-thiazolylthio)-4,5-dimethyloxazole
2-($5^1$-nitro-$2^1$-thiazolylsulphonyl)-4,5-dimethyloxazole
2-($5^1$-nitro-$2^1$-thiazolylsulphonyl)-5-t-butyloxazole
2-($5^1$-nitro-$2^1$-thiazolylthio)-5-t-butyloxazole
2-($5^1$-nitro-$2^1$-thiazolylthio)-4,5-diphenyloxazole
2-($5^1$-nitro-$2^1$-thiazolylthio benzoxazole
2-($5^1$-nitro-$2^1$-thiazolylthio)-4-azabenzoxazole
2-($5^1$-nitro-$2^1$-thiazolylthio)imidazole
2-($5^1$-nitro-$2^1$-thiazolylthio)-1-methylimidazole
2-($5^1$-nitro-$2^1$-thiazolylthio)-1-vinylimidazole
2-($5^1$-nitro-$2^1$-thiazolylsulphonyl)-1-methylimidazole
2-($5^1$-nitro-$2^1$-thiazolylsulphonyl)-1-allylimidazole
2-($5^1$-nitro-$2^1$-thiazolylthio)-1-($\beta$-hydroxyethyl)imidazole
2-($5^1$-nitro-$2^1$-thiazolylthio)-1-phenylimidazole
2-($5^1$-nitro-$2^1$-thiazolylthio)-1-phenylimidazole
2-($5^1$-nitro-$2^1$-thiazolylsulphonyl)-1-benzylimidazole
2-($5^1$-nitro-$2^1$-thiazolylthio)-1-benzylimidazole
2-($5^1$-nitro-$2^1$-thiazolylthio)-1,4,5-trimethylimidazole
2-($5^1$-nitro-$2^1$-thiazolylthio)-1-methyl-4-phenylimidazole
2-($5^1$-nitro-$2^1$-thiazolythio)benzimidazole
2-($5^1$-nitro-$2^1$-thiazolylthio)benzimidazole
2-($5^1$-nitro-$2^1$-thiazolylthio)-4-azabenzimidazole
2-($5^1$-nitro-$2^1$-thiazolylthio)-7-azabenzimidazole
2-($5^1$-nitro-$2^1$-thiazolylsulphonyl)benzimidazole.

The appropriate mercapto compounds of formula II, which are reacted with a 2-halo-5-nitrothiazole to form the above compounds, are for the most part known compounds. Any that are not are prepared by methods analogous to those used for preparing the known mercapto intermediate compounds. Full details of appropriate methods for preparing these mercapto intermediates can readily be obtained from standard chemical text books such as "Heterocyclic Compounds" published by John Wiley and Sons, "The Chemistry of Heterocyclic Compounds" published by Interscience, and "Advances in Heterocyclic Chemistry" published by Academic Press.

A stated above, the compounds of this invention are useful as fungicides. They show useful activity against a variety of fungi which attack economically valuable plant life and particularly are useful in the treatment of grey mould and downey mildew infections of fruits, especially grapes, in which treatment they may be used to eradicate or control such infections as well as to prevent the establishment of the disease. The compounds also possess useful activity against various fungi pathogenic to animals, including humans, such as fungi in the genus Candida, especially *C. albicans*, and dermatophytes such as *Trichophyton mentagrophytes*.

Accordingly the present invention in a further aspect provides a method of treating plants susceptible to or suffering from fungal attack, and particularly a method of treating fruits such as grapes susceptible to grey mould and downey mildew infections, which comprises applying to said plants or fruits a fungicidal amount of a compound of formula I. The compounds may be applied to the foliage of the plants, and/or to the soil or water in which the plants are growing, and the compounds will normally be applied in the form of fungicidal compositions. According therefore to another aspect of the present invention, there is provided a fungicidal composition comprising the active ingredient in association with a non-phytotoxic diluent or carrier material and a process for preparing such fungicidal compositions comprising mixing a fungicidally-active ingredient of formula I with said diluent or carrier material. The latter may be, for example, one or more of water, alcohols, glycols, glycol-ethers, petroleum distillates and various dispersion media such as surfactants, emulsifiers and finely divided inert solids. The concentration of the active ingredient in these compositions will vary depending on whether the composition is to be used directly as a dust or is intended as an emulsifiable concentrate or wettable powder designed to be subsequently diluted for example with water prior to use.

Since in use the compounds will normally be applied to infected or susceptible plants as compositions containing from about 5 to 3000 p.p.m., preferably from about 200 to 2000 p.p.m., of the active ingredient, it is normally convenient for ease of formulation, storage, package, etc., to formulate the active ingredient as a liquid or solid concentrate composition.

Liquid concentrates may be prepared by dissolving, dispersing or suspending from 0.1 to 50% of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products or alkylene oxides with phenols and organic acids, polyoxyethylene derivatives of sorbitan esters, complex ether-alcohols and the like.

Solid concentrate mixtures may be prepared by incorporating from 5 to 90% of the active ingredient in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The active ingredient of the invention may also be incorporated in tablets, pellets, capsules or formulated as aerosols or sprays to ensure that the fungicidal action can be obtained at the locus of the disease.

The present invention also provides a method of treating fungal infections in animals which comprises applying to the locus of the fungus or administering to the animal suffering from the fungal infection an effective dose of an active ingredient of formula I. To administer or apply the active ingredient, it will normally be necessary to present the active compound of formula I in the form of a pharmaceutical composition comprising the active ingredient in association with a pharmaceutically acceptable diluent or carrier therefor. Such pharmaceutical compositions also form a part of this invention. The type of composition will of course depend on the proposed mode of use. Thus, for internal administration to animals, including humans, the compositions will include tablets, capsules, powders, suppositories, suspensions and injection solutions. Such compositions will normally contain from 5 to 1000 mg. of the active ingredient and will be administered in such a way as to provide the subject requiring treatment with from 0.1 to 30 mg./kg. per day. For external use, the compositions may be in the form of creams, ointments, tinctures and emulsions which will normally contain, in concentrate form, from 0.5 to 50% by weight of the active ingredient. It will, of course, readily be understood that the amount of active ingredient actually to be administered will be determined by a physician in the light of all the relevant circumstances including the condition of the patient who is to be treated, the infection being suffered and the route of administration. Accordingly, the above preferred dosage range is not intended to limit the scope of the present invention in any way.

The formulations of the present invention normally will consist of at least one compound of formula I mixed with a carrier, or diluted by a carrier, or enclosed or encapsulated by an ingestible carrier in the form of a capsule, sachet, cachet, paper or other container or by a disposable container such as an ampoule. A carrier or diluent may be a solid, semi-solid or liquid material, which serves as a vehicle, excipient or medium for the active therapeutic substance.

Some examples of the diluents or carriers which may be employed in the pharmaceutical compositions of the present invention are lactose, dextrose, sucrose, sorbitol, mannitol, propylene glycol, liquid paraffin, white soft paraffin, kaolin, microcrystalline cellulose, calcium silicate, silica polyvinylpyrrolidone, cetostearyl alcohol, starch, gum acacia, calcium phosphate, cocoa butter, oil of theobroma, arachis oil, alginates, tragacanth, gelatin, syrup B.P., methyl cellulose, polyoxyethylene sorbitan monolaurate, ethyl lactate, methyl- and propylhydroxybenzoate, sorbitan trioleate, sorbitan sesquioleate and oleyl alcohol.

The following examples will further illustrate the preparation of the compounds of this invention.

EXAMPLE 1

Pyridine (0.03 mole) was added to a solution in acetone (25 ml.) of 2-mercapto-4-methyloxazole (0.03 mole)—prepared by reaction of hydroxyacetone with potassium thiocyanate and hydrochloric acid. The mixture was stirred at room temperature and 5-nitro-2-bromothiazole (0.03 mole) in acetone (25 ml.) was added dropwise over a period of three minutes. After the addition, the mixture was refluxed for one hour, cooled and poured into ice/water (400 ml.). After stirring for one hour, the precipitate was collected, washed wtih water, dried and recrystallized from carbon tetrachloride to yield 2-($5^1$-nitro-$2^1$-thiazolylthio)-4-methyloxazole, M.P. 62–3° C. Similarly, the corresponding 4-ethyl- and 4-*iso*propyloxazoles were prepared and each gave satisfactory microanalytical results.

The 4-methyl, 4-ethyl and 4-*iso*propyl compounds were converted to the corresponding sulphones as follows:

The 2-($5^1$-nitro-$2^1$-thiazolylthio)-4-substituted oxazole (0.008 mole) was dissolved in glacial acetic acid (30 mls.) and a 30% solution of hydrogen peroxide (5 ml.)

was added. The mixture was heated at 70° C. until thin layer chromatography showed the absence of starting material (approximately three hours). Evaporation of the acetic acid *in vacuo*, followed by addition of water, precipitated the desired product which was stirred overnight in water, collected and dried to yield the desired 2-(5$^1$-nitro-2$^1$-thiazolylsulphonyl)-4-substituted oxazoles, the structures being confirmed by microanalysis.

EXAMPLE 2

2-mercapto-5-phenyloxazole (0.02 mole)—prepared by treatment of α-aminoacetophenone with carbon disulphide in the presence of sodium carbonate—was dissolved in methanol (25 ml.) and sodium (0.02 mole) in methanol (10 ml.) was added. The mixture was stirred at room temperature and a solution of 5-nitro-2-bromothiazole (0.02 mole) in acetone (15 ml.) was added dropwise over a period of two minutes. The reaction mixture was heated to 50° C. and then stirred for one hour at room temperature. The reaction mixture was poured into ice/water (400 ml.) and worked up as described in Example 1 to yield 2-(5$^1$-nitro-2$^1$-thiazolylthio)-5-phenyloxazole, M.P. 165–7° C., which gave satisfactory microanalytical results as did the corresponding 5-methyl- and 5-*t*-butyl compounds also prepared by the above method. These oxazoles are converted to the corresponding sulphones by the method described in Example 1.

EXAMPLE 3

By the method of Example 2 but reacting 2-mercapto-4,5-dimethyloxazole—prepared by reaction of acetoin with potassium thiocyanate and hydrochloric acid—with 5-nitro-2-bromothiazole, there was obtained 2-(5$^1$-nitro-2$^1$-thiazolylthio)-4,5-dimethyloxazole, M.P. 103–4° C.

EXAMPLE 4

By the method of Example 1 but reacting 2-mercapto-1-methylimidazole—prepared by heating the diethyl acetal of aminoacetaldehyde with methyl *iso*thiocyanate—with 5-nitro-2-bromothiazole, there was obtained 2-(5$^1$-nitro-2$^1$-thiazolylthio)-1-methylimidazole, M.P. 105–7° C.

EXAMPLE 5

Using methods described in Examples 1 to 4, the following compounds were prepared from the corresponding known mercapto intermediates:

2-(5$^1$-nitro-2$^1$-thiazolylthio) benzoxazole, M.P. 122–3° C.
2-(5$^1$-nitro-2$^1$-thiazolylthio) benzimidazole, M.P. 162–4° C.
2-(5$^1$-nitro-2$^1$-thiazolylthio)-4-azabenzimidazole, M.P. 187–9° C.

The following examples illustrate the fungicidal compositions of the present invention.

EXAMPLE 6

| | Percent by weight |
|---|---|
| 2-(5$^1$-nitro-2$^1$-thiazolylthio)-4-methyloxazole | 40 |
| Sodium lauryl sulphate | 8 |
| Isooctyl phenyl polyethoxyethanol | 6 |
| China clay | 46 |

The above ingredients were mixed to form a wettable powder concentrate. In use, this concentrate is diluted with water to form a spray composition containing from 300 to 600 p.p.m. of active ingredients.

EXAMPLE 7

An emulsifiable concentrate containing the following ingredients was prepared:

| | Percent by weight |
|---|---|
| 2-(5$^1$-nitro-2$^1$-thiazolylthio) benzoxazole | 20 |
| Sodium alkyl aryl sulphonate blend | 7 |
| Polyoxyethylene sorbitan monolaurate | 5 |
| Xylene | 68 |

This concentrate is diluted prior to use with water to form a sprayable emulsion containing from 200 to 400 p.p.m. of active ingredient.

EXAMPLE 8

An emulsifiable concentrate having the following ingredients was prepared:

| | Percent by weight |
|---|---|
| 2-(5$^1$-nitro-2$^1$-thiazolylthio)-4,5-dimethyloxazole | 40 |
| Mixture of an ionic and nonionic emulsifiers | 16 |
| Acetone | 44 |

This concentrate is diluted prior to use with water to form a sprayable composition from 400 to 800 p.p.m. of active ingredient.

EXAMPLE 9

A wettable powder concentrate was prepared by mixing the following ingredients:

| | Percent by weight |
|---|---|
| 2-(5$^1$-nitro-2$^1$-thiazolylthio) benzimidazole | 80 |
| Anionic surfactant | 10 |
| Kaolin | 10 |

In use, this powder is dispersed in water to form a composition containing from 600 to 1000 p.p.m. of active ingredient.

The following examples illustrate pharmaceutical compositions containing as active ingredient a compound of formula 1.

EXAMPLE 10

A washable ointment having the following composition was prepared:

| | G. |
|---|---|
| 2-(5$^1$-nitro-$^2$1-thiazolylthio) benzoxazole | 1.0 |
| Polyethylene glycol 400 | 50.0 |
| Polyethylene glycol 4000 | 49.0 |

The polyethylene glycol 4000 was heated until molten and the polyethylene glycol 400 added with stirring to give a homogenous mixture. Into this, the active ingredient was incorporated and the mixture stirred until cool.

EXAMPLE 11

A dusting powder was prepared as follows:

| | G. |
|---|---|
| 2-(5$^1$-nitro-2$^1$-thiazolylthio)-4-methyloxazole | 0.5 |
| Magnesium carbonate | 5.0 |
| Calcium carbonate | 10.0 |
| Zinc oxide | 5.0 |
| Talc to 100.0 g. | |

The active ingredient was triturated with the calcium carbonate and the magnesium carbonate and zinc oxide added with thorough mixing. The talc was then added and, after being well mixed, the resultant powder was sieved through a 60 mesh British Standard sieve.

EXAMPLE 12

A cream containing the following components was prepared:

| | G. |
|---|---|
| 2-(5$^1$-nitro-2$^1$-thiazolylthio)-4-methyloxazole | 2.0 |
| Cetostearyl alcohol | 8.5 |
| Sodium lauryl sulphate | 0.9 |
| White soft paraffin | 15.0 |
| Liquid paraffin | 6.0 |
| Distilled water to 100.0 g. | |

The cetostearyl alcohol and sodium lauryl sulphate were heated together to 70° C. The paraffins were added and the mixture stirred until homogenous, the temperature being maintained at about 55° C. The active ingredient was incorporated into the oily mixture and then water at the same temperature was added slowly with constant stirring which was continued until the resultant cream was cold.

EXAMPLE 13

Tablets having the following ingredients were prepared:

| | Per tablet, mg. |
|---|---|
| 2-($5^1$-nitro-$2^1$-thiazolylthio) benzoxazole | 100 |
| Starch | 50 |
| Lactose | 35 |
| Ethyl cellulose (as 20% solution in industrial alcohol) | 3 |
| Alginic acid | 8 |
| Magnesium stearate | 2 |
| Talc | 2 |
| | 200 |

The active ingredient, starch and lactose were thoroughly mixed and the solution of ethyl cellulose added. The resultant powder was sieved through a No. 12 British Standard screen. The granules produced were dried, the remaining ingredients added and, after thorough mixing, the mixture was compressed into tablets each containing 100 mg. of active ingredient.

EXAMPLE 14

Capsules having the following ingredients were prepared:

| | Per capsule, mg. |
|---|---|
| 2-($5^1$-nitro-$2^1$-thiazolylthio) benzoxazole | 250 |
| Lactose | 48 |
| Magnesium stearate | 2 |

The ingredients were thoroughly mixed, sieved through a No. 44 British Standard screen and filled into hard gelatin capsules in 250 mg. quantities.

We claim:

1. Compound of the formula:

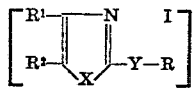

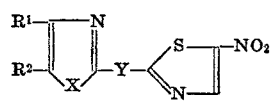

wherein Y is sulphur or a sulphonyl group; X is oxygen or —$NR^3$; $R^3$ is selected from hydrogen, $C_{1-4}$ alkyl, $C_{1-4}$ hydroxyalkyl, $C_{2-4}$ alkenyl, phenyl and phenyl-$C_{1-4}$ alkyl; and $R^1$ and $R^2$ are individually selected from hydrogen, $C_{1-4}$ alkyl and phenyl, or $R^1$ and $R^2$ together form a —CH=CH—CH=$R^4$— chain wherein $R^4$ is =CH— or =N—.

2. Compound according to claim 1, wherein Y is sulphur, X is oxygen or —$NR^3$, $R^3$ being selected from hydrogen, methyl, ethyl, vinyl, allyl, phenyl and benzyl, and $R^1$ and $R^2$ are individually selected from hydrogen, methyl, ethyl and phenyl, or $R^1$ and $R^2$ together represent a —CH=CH—CH=CH— chain.

3. Compound according to claim 1, said compound being a 2-($5^1$-nitro-$2^1$-thiazolylthio) - 4 - methyl-, 4,5-dimethyl- or 5-phenyl oxazole.

4. Compound according to claim 1, said compound being 2-($5^1$-nitro-$2^1$-thiazolylthio) benzoxazole.

5. Compound according to claim 1, said compound being 2-($5^1$-nitro-$2^1$-thiazolylthio)-4,5-dimethyl oxazole.

References Cited

FOREIGN PATENTS 12,643     1964     Japan.

RICHARD J. GALLAGHER, Primary Examiner

U.S. Cl. X.R.

260—307 R, 309; 424—270

PO-1050
(5/69)

UNITED STATES PATENT OFFICE
CERTIFICATE OF CORRECTION

Patent No. 3,813,401        Dated May 28, 1974

Inventor(s) Peter Graham Hughes and John Pomfret Verge

It is certified that error appears in the above-identified patent and that said Letters Patent are hereby corrected as shown below:

In column 1, line 18, "again" should read --against--.

In column 2: in lines 3-6, that portion of the formula reading 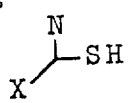 should read 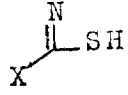 ; in line 6, "I" should read --II--; in line 40, "thiazolylthio benzoxazole" should read --thiazolylthio)benzoxazole--; in line 50, "phenylimidazole" should read --phenethylimidazole--; and line 56 is a repeat of line 55 and should be deleted.

In column 6: in line 13, "composition from" should read --composition containing from--; in line 34 "nitro-2¹-thiazolylthio" should read --nitro-2¹-thiazolylthio--; in line 39, "stiring" should read --stirring--.

In column 7, lines 35-38, the formula enclosed in brackets should be omitted.

Signed and sealed this 18th day of February 1975.

(SEAL)
Attest:

RUTH C. MASON
Attesting Officer

C. MARSHALL DANN
Commissioner of Patents
and Trademarks